United States Patent
Kim (10) Patent No.: US 9,025,310 B2
(45) Date of Patent: May 5, 2015

(54) MULTILAYER CERAMIC CAPACITOR AND METHOD OF MANUFACTURING THE SAME

(71) Applicant: Samsung Electro-Mechanics Co., Ltd., Suwon, Gyunggi-do (KR)

(72) Inventor: Hyung Joon Kim, Gyunggi-do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 139 days.

(21) Appl. No.: 13/924,500

(22) Filed: Jun. 21, 2013

(65) Prior Publication Data

US 2014/0301015 A1  Oct. 9, 2014

(30) Foreign Application Priority Data

Apr. 8, 2013 (KR) .......................... 10-2013-0038320

(51) Int. Cl.
| | |
|---|---|
| *H01G 4/06* | (2006.01) |
| *H01G 4/30* | (2006.01) |
| *H01G 4/012* | (2006.01) |
| *H01G 4/12* | (2006.01) |
| *H01G 4/232* | (2006.01) |

(52) U.S. Cl.
CPC ................ *H01G 4/30* (2013.01); *H01G 4/012* (2013.01); *H01G 4/12* (2013.01); *H01G 4/232* (2013.01)

(58) Field of Classification Search
USPC ................ 361/321.2, 301.2, 301.4, 303–305, 361/306.1, 306.3, 311–313, 321.1
See application file for complete search history.

(56) References Cited

U.S. PATENT DOCUMENTS

| | | | |
|---|---|---|---|
| 6,295,196 B1 * | 9/2001 | Hamaji et al. | 361/321.2 |
| 7,625,420 B1 * | 12/2009 | Kodas et al. | 75/252 |
| 7,635,519 B2 * | 12/2009 | Onoue et al. | 428/411.1 |
| 7,799,409 B2 * | 9/2010 | Iguchi et al. | 428/210 |
| 8,345,405 B2 * | 1/2013 | Jeong et al. | 361/311 |
| 2010/0225437 A1 | 9/2010 | Ueda et al. | |
| 2011/0157767 A1 | 6/2011 | Hur et al. | |
| 2012/0229950 A1 | 9/2012 | Kim et al. | |
| 2013/0114182 A1 * | 5/2013 | Suh et al. | 361/321.2 |
| 2013/0208399 A1 | 8/2013 | Morita et al. | |

FOREIGN PATENT DOCUMENTS

| | | |
|---|---|---|
| JP | 10-289807 A | 10/1998 |
| JP | 2011-139021 A | 7/2011 |

(Continued)

OTHER PUBLICATIONS

Korean Office Action issued in Korean Application No. 10-2013-0038320 dated Jun. 16, 2014, w/English translation.

*Primary Examiner* — Nguyen T Ha (74) *Attorney, Agent, or Firm* — McDermott Will & Emery LLP (57) ABSTRACT

There is provided a multilayer ceramic capacitor including a ceramic body having first and second side surfaces and third and fourth end surfaces, a plurality of internal electrodes and having one ends exposed to the third or fourth end surface, and first and second side margin parts formed so that an average thickness from the first and second side surfaces to edges of the internal electrodes is 18 μm or less, wherein when the first or second side margin part is divided into two regions by a virtual line obtained by connecting mid points of distances between the edges of the internal electrodes and points at which lines extended from the internal electrodes contact the first or second side surface, when a region adjacent to the internal electrodes is defined as S1 and a porosity of S1 is defined as P1, P1 is in a range of 1 to 20 ($1 \leq P1 \leq 20$).

13 Claims, 8 Drawing Sheets

(56) References Cited

FOREIGN PATENT DOCUMENTS

| | | |
|---|---|---|
| KR | 10-1141342 B1 | 5/2012 |
| WO | 2010035559 A1 | 4/2010 |
| WO | 2012/023334 A1 | 2/2012 |

* cited by examiner

MULTILAYER CERAMIC CAPACITOR AND METHOD OF MANUFACTURING THE SAME

CROSS-REFERENCE TO RELATED APPLICATION

This application claims the priority of Korean Patent Application No. 10-2013-0038320 filed on Apr. 8, 2013, in the Korean Intellectual Property Office, the disclosure of which is incorporated herein by reference.

BACKGROUND OF THE INVENTION

1. Field of the Invention

The present invention relates to a multilayer ceramic capacitor and a method of manufacturing the same, and more particularly, to a high capacitance multilayer ceramic capacitor having excellent reliability, and a method of manufacturing the same.

2. Description of the Related Art

Generally, electronic components using a ceramic material, such as a capacitor, an inductor, a piezoelectric element, a varistor, a thermistor, or the like, include a ceramic body formed of a ceramic material, internal electrodes formed in the ceramic body, and external electrodes mounted on external surfaces of the ceramic body so as to be connected to the internal electrodes.

Among ceramic electronic components, a multilayer ceramic capacitor is configured to include a plurality of stacked dielectric layers, internal electrodes disposed to face each other, having the dielectric layer therebetween, and external electrodes electrically connected to the internal electrodes.

Multilayer ceramic capacitors have been widely used as components in computers and mobile communications devices such as personal digital assistants (PDAs), mobile phones, and the like, due to advantages thereof such as a small size, high capacitance, ease of mounting, or the like.

Recently, as electronic products have been miniaturized and multi-functionalized, chip components have also tended to be miniaturized and multi-functionalized. As a result, there is a need to miniaturize multilayer ceramic capacitors and increase the capacity thereof.

In order to increase the capacitance of multilayer ceramic capacitors, methods of thinning the dielectric layers thereof, stacking the thinned dielectric layers, and improving coverage of the internal electrodes have been considered. In addition, a method for improving an area of the internal electrodes overlapped for forming capacitance has been considered.

In general, multilayer ceramic capacitors have been manufactured as follows. First, a ceramic green sheet is prepared, and a conductive paste is printed on the ceramic green sheet to form the internal electrode. The ceramic green sheets having the internal electrodes formed thereon are stacked in an amount of several tens of layers to several hundreds of layers to fabricate a green ceramic multilayer body. Thereafter, the green ceramic multilayer body is compressed under conditions of high temperature and high pressure to fabricate a hard green ceramic multilayer body, and a cutting process is performed on the ceramic multilayer body to fabricate a green chip. Next, the green chip is calcined and sintered, and the external electrodes are formed thereon to complete the multilayer ceramic capacitor.

In the case of manufacturing a multilayer ceramic capacitor through the above-described manufacturing method, since it is difficult to significantly decrease a margin part region of the dielectric layer on which the internal electrode is not formed, there is a limitation in increasing the overlapped area of the internal electrodes. In addition, since the margin part of an edge of the multilayer ceramic capacitor is formed to be thicker than margin parts in other regions, it is not easy to remove carbon therefrom at the time of calcining and sintering.

In order to solve the above-described problems, a method, in which the margin part region on which the internal electrode is not formed is formed in the previously manufactured ceramic multilayer body, has been considered, but the ceramic multilayer body may be vulnerable to impact due to pores generated in a boundary surface between a cover region of the ceramic multilayer body and the margin part.

A ceramic multilayer body of which a porosity of a cover region is controlled is disclosed in the following Related Art Document, but the above-mentioned problem may not be solved.

RELATED ART DOCUMENT

Japanese Patent Laid-open Publication No. 10-289807

SUMMARY OF THE INVENTION

An aspect of the present invention provides a high-capacitance multilayer ceramic capacitor having excellent reliability, and a method of manufacturing the same.

According to an aspect of the present invention, there is provided a multilayer ceramic capacitor including: a ceramic body having first and second side surfaces opposing each other and third and fourth end surfaces connecting the first and second side surfaces to each other; a plurality of internal electrodes formed in the ceramic body and having one ends thereof exposed to the third or fourth end surface; and first and second side margin parts formed so that an average thickness from the first and second side surfaces to edges of the internal electrodes is 18 μm or less, wherein when the first or second side margin part is divided into two regions by a virtual line obtained by connecting mid points of distances between the edges of the internal electrodes and points at which lines extended from the internal electrodes contact the first or second side surface, in the case in which a region adjacent to the internal electrodes is defined as S1 and a porosity of S1 is defined as P1, P1 is in a range of 1 to 20 ($1 \leq P1 \leq 20$).

The first and second side margin parts may be formed of ceramic slurry.

The internal electrode may include a first internal electrode having one end thereof exposed to the third end surface and the other end formed to have a predetermined interval from the fourth end surface and a second internal electrode having one end thereof exposed to the fourth end surface and the other end formed to have a predetermined interval from the third end surface.

According to an aspect of the present invention, there is provided a multilayer ceramic capacitor including: a ceramic body having first and second side surfaces opposing each other and third and fourth end surfaces connecting the first and second side surfaces to each other; a plurality of internal electrodes formed in the ceramic body and having one ends thereof exposed to the third or fourth end surface; and first and second side margin parts formed so that an average thickness from the first and second side surfaces to edges of the internal electrodes is 18 μm or less, wherein when the first or second side margin part is divided into two regions by a virtual line obtained by connecting mid points of distances between the edges of the internal electrodes and points at which lines extended from the internal electrodes contact the first or second side surface, in the case in which a region adjacent to the internal electrode is defined as S1, a region adjacent to the first or second side surface is defined as S2, a porosity of S1 is defined as P1, and a porosity of S2 is defined as P2, P1/P2 is larger than 2 (P1/P2>2).

The first and second side margin parts may be formed of ceramic slurry.

The internal electrode may include a first internal electrode having one end thereof exposed to the third end surface and the other end formed to have a predetermined interval from the fourth end surface, and a second internal electrode having one end thereof exposed to the fourth end surface and the other end formed to have a predetermined interval from the third end surface.

According to an aspect of the present invention, there is provided a method of manufacturing a multilayer ceramic capacitor, the method including: preparing a first ceramic green sheet on which a plurality of stripe-type first internal electrode patterns are formed to have a predetermined interval therebetween and a second ceramic green sheet on which a plurality of stripe-type second internal electrode patterns are formed to have a predetermined interval therebetween; forming a ceramic green sheet multilayer body by stacking the first and second ceramic green sheets so that the stripe-type first and second internal electrode patterns are alternately stacked; cutting the ceramic green sheet multilayer body while traversing the stripe-type first and second internal electrode patterns so that first and second internal electrodes have a predetermined width and the ceramic green sheet multilayer body has side surfaces to which edges of the first and second internal electrodes are exposed in a width direction; and forming first and second side margin parts on the side surfaces to which the edges of the first and second internal electrodes are exposed by using ceramic slurry, wherein the first and second side margin parts are formed so that an average thickness from the first and second side surfaces to the edges of the internal electrodes is 18 μm or less, and when the first or second side margin part is divided into two regions by a virtual line obtained by connecting mid points of distances between the edges of the internal electrodes and points at which lines extended from the internal electrodes contact the first or second side surface, in the case in which a region adjacent to the internal electrodes is defined as S1 and a porosity of S1 is defined as P1, P1 is in a range of 1 to 20 ($1 \leq P1 \leq 20$).

In the forming of the ceramic green sheet multilayer body, the ceramic green sheets may be stacked so that a central portion of the stripe-type first internal electrode pattern and the predetermined interval between the stripe-type second internal electrode patterns are overlapped with each other.

The cutting of the ceramic green sheet multilayer body may include: cutting the ceramic green sheet multilayer body into bar-type multilayer bodies having side surfaces to which edges of the first and second internal electrodes are exposed: and cutting through a central portion of the first internal electrode and cutting through the predetermined interval between the second internal electrodes, along the same cutting line, to form multilayer bodies having a third or fourth end surface to which one end of the first or second internal electrode is exposed, respectively, after the forming of the first and second side margin parts.

The cutting of the ceramic green sheet multilayer body may include: cutting the ceramic green sheet multilayer body into bar-type multilayer bodies having side surfaces to which edges of the first and second internal electrodes are exposed: and cutting a bar-type multilayer bodies so that a central portion of the first internal electrode cutting through the predetermine interval between the second internal electrodes are cut along the same cutting line to form multilayer bodies having a third or fourth end surface to which one ends of the first or second internal electrodes are exposed, cutting through a central portion of the first internal electrode and cutting through the predetermine interval between the second internal electrodes along the same cutting line in the bar-type multilayer bodies so as to form multilayer bodies having a third or fourth end surface to which one ends of the first or second internal electrodes are exposed, respectively, and the forming of the first and second side margin parts may be performed on the multilayer bodies.

The forming of the first and second side margin parts may be performed by applying the ceramic slurry to the side surfaces to which the edges of the first and second internal electrodes are exposed.

The forming of the first and second side margin parts may be performed by dipping the side surfaces to which the edges of the first and second internal electrodes are exposed in the ceramic slurry.

When the first or second side margin part is divided into two regions by a virtual line obtained by connecting mid points of distances between the edges of the internal electrodes and points at which lines extended from the internal electrodes contact the first or second side surface, in the case in which a region adjacent to the first or second side surface is defined as S2, and a porosity of S2 is defined as P2, P1/P2 may be larger than 2 (P1/P2>2).

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
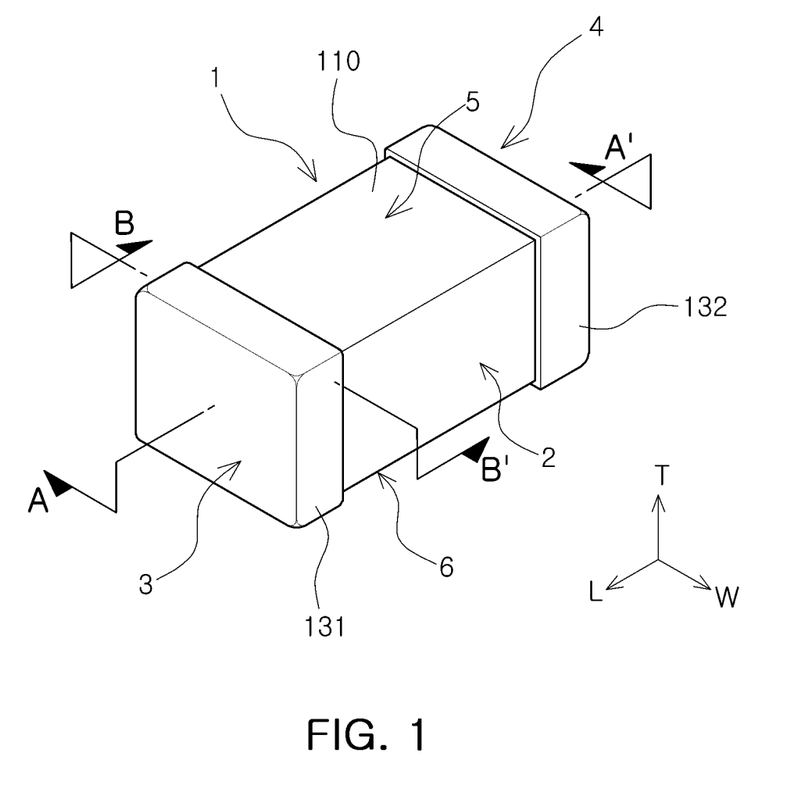
FIG. 1 is a schematic perspective view showing a multilayer ceramic capacitor according to an embodiment of the present invention.

FIG. 1 is a schematic perspective view showing a multilayer ceramic capacitor according to an embodiment of the present invention.

Figure 2:
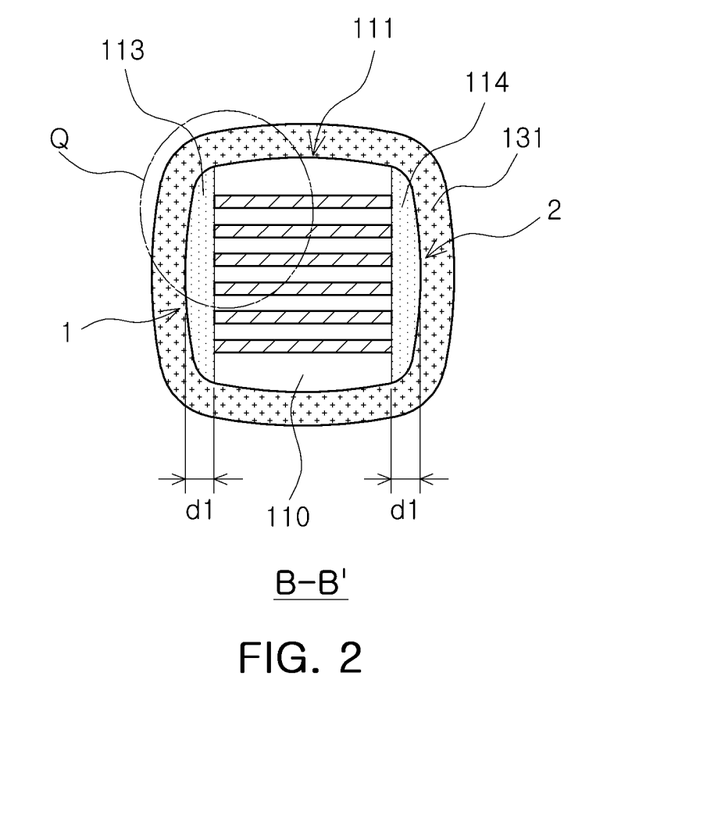
FIG. 2 is a cross-sectional view taken along line B-B' of FIG. 1.

FIG. 2 is a cross-sectional view taken along line B-B' of FIG. 1.

Figure 3:
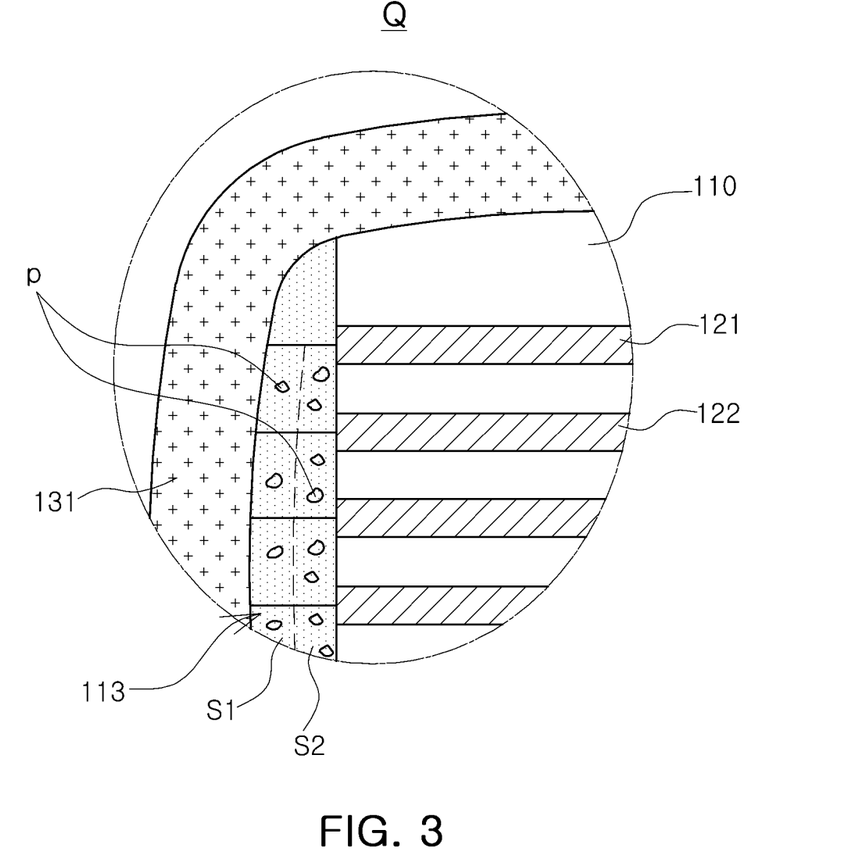
FIG. 3 is an enlarged view of part Q of FIG. 2.

FIG. 3 is an enlarged view of part Q of FIG. 2.

Figure 4:
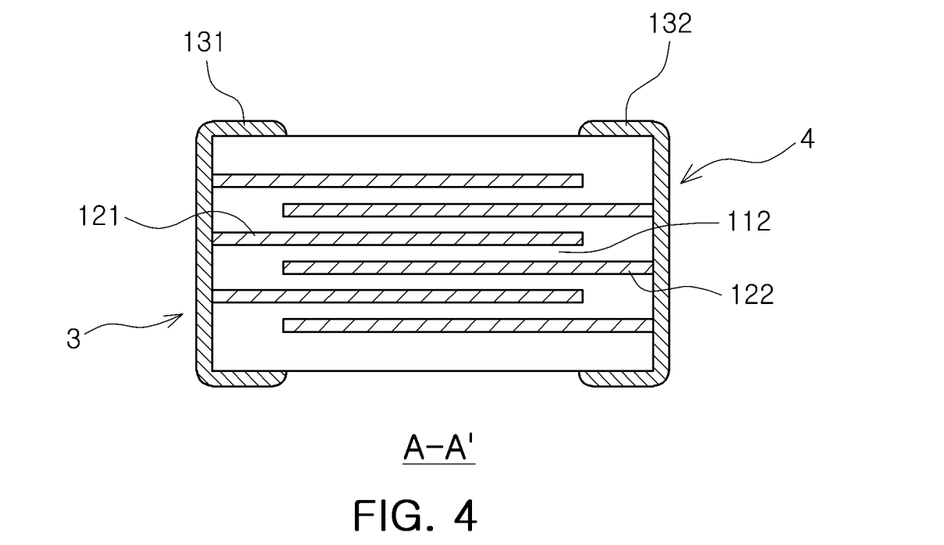
FIG. 4 is a cross-sectional view taken along line A-A' of FIG. 1.
Figure 5:
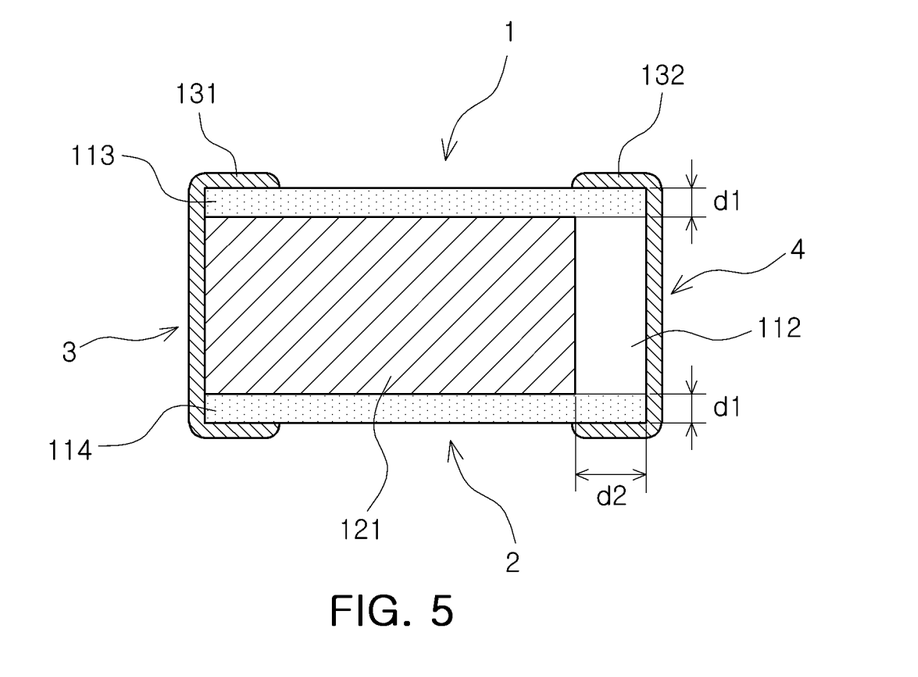
FIG. 5 is an upper plan view showing a dielectric layer configuring the multilayer ceramic capacitor shown in FIG. 1.

FIG. 4 is a cross-sectional view taken along line A-A' of FIG. 1, and FIG. 5 is an upper plan view showing a dielectric layer configuring the multilayer ceramic capacitor shown in FIG. 1.

Referring to FIGS. 1 through 5, the multilayer ceramic capacitor according to the embodiment of the present invention may include a ceramic body 110; a plurality of internal electrodes 121 and 122 formed in the ceramic body; and external electrodes 131 and 132 formed on outer surfaces of the ceramic body.

The ceramic body 110 may have first and second side surfaces 1 and 2 opposing to each other and third and fourth end surfaces 3 and 4 connecting the first and second side surfaces.

A shape of the ceramic body 110 is not particularly limited, but may be a rectangular parallelepiped shape as shown in FIG. 1.

The plurality of internal electrodes 121 and 122 formed in the ceramic body 110 may have one ends thereof exposed to the third or fourth end surface 3 or 4 of the ceramic body.

The internal electrode may be formed as a pair of first and second internal electrodes 121 and 122 having different polarities. One end of the first internal electrode 121 may be exposed to the third end surface 3 and one end of the second internal electrode 122 may be exposed to the fourth end surface 4. The other ends of the first and second internal electrodes 121 and 122 may be formed to be spaced apart from the third or fourth end surface 3 or 4 by a predetermined interval. A detailed description thereof will be provided below.

The first and second external electrodes 131 and 132 may be formed on the third and fourth end surfaces 3 and 4 of the ceramic body to thereby be electrically connected to the internal electrodes.

The plurality of internal electrodes may be formed in the ceramic body, and a distance d1 from each edge of the plurality of internal electrodes to the first or second side surface may be 18 μm or less. This may refer to that an average distance d1 from the edges of the plurality of internal electrodes to the first or second side surface may be 18 μm or less.

The edge of the internal electrode may refer to one region of the internal electrode adjacent to the first or second side surface 1 or 2 of the ceramic body. A region from the edge of the internal electrode to the first or second side surface may be referred to as a first or second side margin part 113 or 114.

The distance d1 from the edge of the internal electrode to the first or second side surface 1 or 2 may have a slight difference in the plurality of internal electrodes, but according to the embodiment of the present invention, there is no deviation or a slight deviation in the distance d1. This feature may be more clearly understood by a method of manufacturing a multilayer ceramic capacitor according to the embodiment of the present invention.

According to the embodiment of the present invention, the ceramic body 110 may be configured of a multilayer body 111 in which a plurality of dielectric layers 112 are stacked and the first and second side margin parts 113 and 114 formed at both side surfaces of the multilayer body. In this case, the distance d1 from each of the edges of the plurality of internal electrodes to the first or second side surface, which is formed by the first and second side margin parts 113 and 114, corresponds to a thickness of the first or second side margin part 113 or 114.

The plurality of dielectric layers 112 configuring the multilayer body 111 may be in a sintered state and be integrated so as not to easily confirm a boundary between the adjacent dielectric layers.

A length of the multilayer body 111 may correspond to a length of the ceramic body 110, and the length of the ceramic body 110 may correspond to a distance between the third and fourth end surfaces 3 and 4 of the ceramic body. That is, the third and fourth end surfaces of the ceramic body 110 may be considered as third and fourth end surfaces of the multilayer body 111.

The multilayer body 111 may be formed by stacking the plurality of dielectric layers 112, and a length of the dielectric layer 112 may be the same as the distance between the third and fourth end surfaces 3 and 4 of the ceramic body.

Although not limited thereto, according to the embodiment of the present invention, the length of the ceramic body may be 400 to 1400 μm. In more detail, the length of the ceramic body may be 400 to 800 μm or 600 to 1400 μm.

The internal electrodes 121 and 122 may be formed on the dielectric layer and be formed in the ceramic body by the sintering, having one dielectric layer therebetween.

Referring to FIG. 5, the first internal electrode 121 may be formed on the dielectric layer 112. The first internal electrode 121 is not entirely formed in a length direction of the dielectric layer. That is, one end of the first internal electrode 121 may be formed to have a predetermined interval d2 from the fourth end surface 4 of the ceramic body, and the other end of the first internal electrode 121 may be formed up to the third end surface 3 to thereby be exposed to the third end surface 3.

The other end of the first internal electrode exposed to the third end surface 3 of the multilayer body may be connected to the first external electrode 131.

Differently from the first internal electrode, one ends of the second internal electrode 122 may be formed to have a predetermined interval from the third end surface 3, and the other end of the second internal electrode 122 may be exposed to the fourth end surface 4 to thereby be connected to the second external electrode 132.

The dielectric layer 112 may have the same width as that of the first internal electrode 121. That is, the first internal electrode 121 may be entirely formed on the dielectric layer 112 in the width direction of the dielectric layer 112. The width of the dielectric layer and the width of the internal electrode may be based on the first and second side surfaces of the ceramic body.

Although not particularly limited, according to the embodiment of the present invention, the width of the dielectric layer and the width of the internal electrode may be 100 to 900 μm. In more detail, the width of the dielectric layer and the width of the internal electrode may be 100 to 500 μm or 100 to 900 μm.

As the ceramic body is miniaturized, a thickness of the side margin part may have an influence on electrical properties of the multilayer ceramic capacitor. According to the embodiment of the present invention, the side margin part may be formed so as to have a thickness of 18 μm or less, thereby improving properties of the miniaturized multilayer ceramic capacitor.

In the embodiment of the present invention, the internal electrode and the dielectric layer are formed by being simultaneously cut, such that the width of the internal electrode may be equal to that of the dielectric layer. A more detailed description thereof will be described below.

In the embodiment of the present invention, the width of the internal electrodes is equal to the width of the dielectric layer, such that edges of the internal electrode may be exposed to the first and second side surfaces of the multilayer body. Both side surfaces of the multilayer body to which the edges of the internal electrode are exposed may be formed with the first and second side margin parts 113 and 114.

As described above, the distance d1 from each edge of the plurality of internal electrodes to the first or second side surface may correspond to a thickness of the first or second side margin part 113 or 114.

The thickness of the first and second side margin parts 113 and 114 may be 18 μm or less. As the thickness of the first and second side margin parts 113 and 114 is reduced, an area of an overlapped portion between the internal electrodes formed in the ceramic body may become relatively wide.

The thickness of the first and second side margin parts 113 and 114 is not particularly limited as long as short-circuit of the internal electrodes exposed to the side surface of the multilayer body 111 may be prevented. For example, the thickness of the first and second side margin parts 113 and 114 may be 2 μm or more.

When the thickness of the first and second side margin parts is less than 2 μm, mechanical strength against external impacts may be deteriorated, and when the thickness of the first and second side margin parts is more than 18 μm, the area of the overlapped portion between the internal electrodes may be relatively decreased, such that it may be difficult to secure the high capacitance in the multilayer ceramic capacitor.

According to the embodiment of the present invention, the first and second side margin parts 113 and 114 may be formed of ceramic slurry. The thickness of the first and second side margin parts 113 and 114 may be easily controlled by controlling an amount of ceramic slurry and may be thinly formed to be 18 μm or less.

The thickness of the first and second side margin parts 113 and 114 may be an average thickness of each of the margin parts.

The average thickness of the first and second side margin parts 113 and 114 may be measured from an image obtained by scanning a cross-section of the ceramic body 110 in the width direction using a scanning electron microscope (SEM) as shown in FIG. 2.

For example, as shown in FIG. 2, thicknesses at upper, middle, and lower portions that are randomly selected in the thickness direction of the ceramic body may be measured with respect to the first and second side margin parts 113 and 114 randomly sampled from an image obtained by scanning a cross-section of the ceramic body 110 in width-thickness (W-T) directions using a scanning electron microscope (SEM), thereby measuring the average value.

In order to significantly increase the capacitance of the multilayer ceramic capacitor, a method of thinning the dielectric layer, a method of highly stacking a thinned dielectric layer, and a method of increasing coverage of the internal electrode, or the like, have been proposed. Further, a method of increasing an area of an overlapped portion between the internal electrodes forming capacitance has been proposed. In order to increase the area of the overlapped portion between the internal electrodes, a region of the margin part on which the internal electrode is not formed needs to be significantly decreased. In particular, as multilayer ceramic capacitors are miniaturized, the region of the margin part needs to be significantly decreased in order to increase the area of the overlapped portion between the internal electrodes.

According to the embodiment of the present invention, the internal electrode is formed on the entire dielectric layer in the width direction and the thickness of the side margin part is set to be 18 μm or less, such that the area of the overlapped portion between the internal electrodes may become relatively wide.

Generally, as the dielectric layer is highly stacked, the thicknesses of the dielectric layer and the internal electrode are reduced. Therefore, the phenomenon that the internal electrodes are short-circuited may frequently occur. In addition, when the internal electrodes are formed only on a portion of the dielectric layer, an accelerated lifespan or reliability of insulating resistance may be deteriorated due to a step by the internal electrode.

However, according to the embodiment of the present invention, although thin internal electrodes and thin dielectric layers are formed, since the internal electrode is entirely formed on the dielectric layer in the width direction, the area of the overlapped portion between the internal electrodes may be increased, thereby increasing the capacitance of the multilayer ceramic capacitor.

In addition, the step by the internal electrode may be decreased, such that an accelerated lifespan of insulating resistance may be improved, thereby providing the multilayer ceramic capacitor having excellent capacitance characteristics and reliability.

Meanwhile, pores p may be generated in boundary surfaces between the multilayer body 111 and the first and second side margin parts 113 and 114 in the ceramic body 110.

Particularly, the multilayer ceramic capacitor may be vulnerable to impact due to the pores p generated in boundary surfaces between a cover layer C and the side margin part in the ceramic body 110.

According to the embodiment of the present invention, when the first or second side margin part 113 or 114 is divided into two regions by a virtual line obtained by connecting mid points of distances between edges of the internal electrodes 121 and 122 and points at which lines extended from the internal electrodes 121 and 122 contact the first or second side surface 1 or 2, in the case in which a region adjacent to the internal electrodes 121 and 122 is defined as S1 and a porosity of S1 is defined as P1, P1 may be in a range of 1 to 20 ($1 \leq P1 \leq 20$).

External impact such as thermal impact, electric impact, or the like, may be alleviated by controlling the porosity P1 of S1 so as to be in a range of 1 to 20 ($1 \leq P1 \leq 20$), thereby implementing high reliability and high capacitance multilayer ceramic capacitor.

A method of controlling the porosity P1 of S1 so as to be in a range of 1 to 20 ($1 \leq P1 \leq 20$) is not particularly limited, but may be implemented, for example, by controlling a content of glass added to the ceramic paste forming region S1.

The porosity P1 of S1 may be defined as a ratio of an area of the pore to an area of the region S1 adjacent to the internal electrode.

The porosity P1 of S1 may be measured from the image obtained by scanning the cross-section of the ceramic body 110 in the width-thickness (W-T) direction using a scanning electron microscope (SEM) as shown in FIG. 2.

For example, as shown in FIG. 2, the porosity may be measured in the region S1 adjacent to the internal electrode with respect to the first or second side margin part 113 or 114 randomly sampled from the image obtained by scanning the cross-section of the ceramic body 110 in the width-thickness (W-T) directions taken along a central portion of the external electrode 131 using a scanning electron microscope (SEM).

In the case in which the porosity P1 of S1 is less than 1, the thermal impact and sintering cracks may be generated, and in the case in which the porosity is more than 20, a moisture resistance property may be deteriorated, and strength of the ceramic body may be decreased.

In a multilayer ceramic capacitor according to another embodiment of the present invention, similarly to the above-mentioned multilayer ceramic capacitor according to the afore-mentioned embodiment of the present invention, when a first or second side margin part 113 or 114 is divided into two regions by a virtual line obtained by connecting mid points of distances between edges of internal electrodes 121 and 122 and points at which lines extended from the internal electrodes 121 and 122 contact a first or second side surface 1 or 2, in the case in which a region adjacent to the first or second side surface 1 or 2 is defined as S2 and a porosity of S2 is defined as P2, P1/P2 may be larger than 2 (P1/P2>2).

The porosity P2 of S2 may be defined as a ratio of an area of pores to an area of the region S2 adjacent to the first or second side surface 1 or 2.

External impact such as thermal impact, electric impact, or the like, may be alleviated by controlling the porosity P2 of S2 so that P1/P2 is larger than 2 (P1/P2>2), thereby implementing high reliability and high capacitance multilayer ceramic capacitor.

In the case in which P1/P2 is 2 or less, thermal impact and sintering cracks may be generated.

Since the multilayer ceramic capacitor according to another embodiment of the present invention has the same features as those of the above-mentioned multilayer ceramic capacitor according to the afore-mentioned embodiment of the present invention, a detailed description thereof will be omitted.

Hereinafter, a method of manufacturing a multilayer ceramic capacitor according to another embodiment of the present invention will be described below.

FIGS. 6A through 6F are cross-sectional views and perspective views schematically illustrating the method of manufacturing a multilayer ceramic capacitor according to another embodiment of the present invention.

Figure 6A:
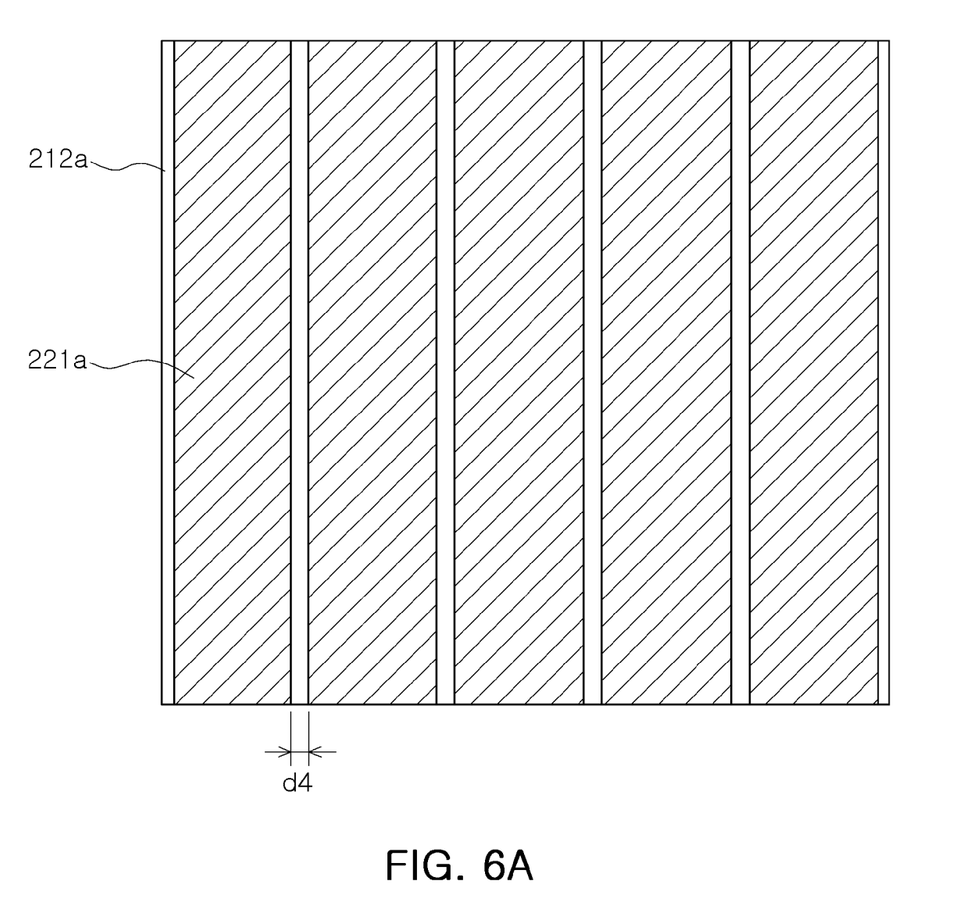
FIGS. 6A through 6F are cross-sectional views and perspective views schematically illustrating the method of manufacturing a multilayer ceramic capacitor according to another embodiment of the present invention.

As shown in FIG. 6A, a plurality of stripe-type first internal electrode patterns 221a may be formed on a ceramic green sheet 212a, having a predetermined interval d4 therebetween. The plurality of stripe-type first internal electrode patterns 221a may be formed in parallel with each other.

The predetermined interval d4, which is a distance in order to insulate the internal electrode from an external electrode having a different polarity, may be considered as a distance of d2×2 shown in FIG. 5.

The ceramic green sheet 212a may be formed of a ceramic paste containing ceramic powder, an organic solvent, and an organic binder.

The ceramic powder is a material having high permittivity, and for example, a barium titanate ($BaTiO_3$)-based material, a lead complex perovskite-based material, strontium titanate ($SrTiO_3$)-based material, or the like, may be used, but the present invention is not limited thereto. Among them, barium titanate ($BaTiO_3$) powder may be used. When the ceramic green sheet 212a is sintered, it may become a dielectric layer 112 configuring a ceramic body.

The stripe-type first internal electrode pattern 221a may be formed of an internal electrode paste containing a conductive metal. The conductive metal may be Ni, Cu, Pd, or an alloy thereof, but is not limited thereto.

A method of forming the stripe-type first internal electrode pattern 221a on the ceramic green sheet 212a is not particularly limited. For example, a printing method such as a screen printing method or a gravure printing method may be used.

Further, although not shown in the drawings, a plurality of stripe-type second internal electrode patterns 222a may be formed on another ceramic green sheet 212a, having a predetermined interval therebetween.

Hereinafter, the ceramic green sheet on which the first internal electrode pattern 221a is formed may be referred to as a first ceramic green sheet, and the ceramic green sheet on which the second internal electrode pattern 222a is formed may be referred to as a second ceramic green sheet.

Figure 6B:
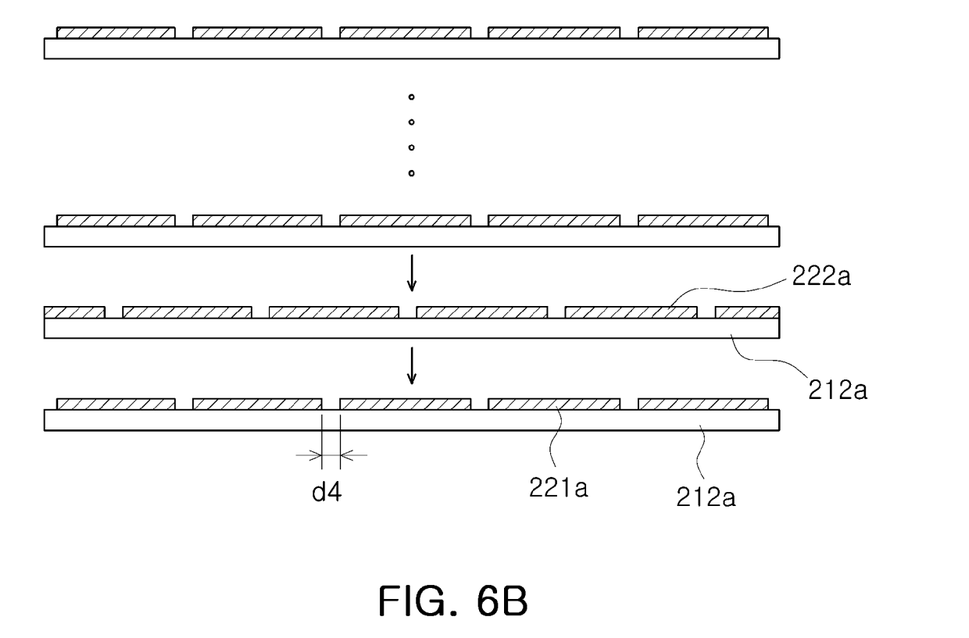

Next, as shown in FIG. 6B, the first and second ceramic green sheets may be alternately stacked so that the stripe-type first and second internal electrode patterns 221a and 222a are alternately stacked.

Thereafter, the stripe-type first internal electrode pattern 221a may form a first internal electrode 121 and the stripe-type second internal electrode pattern 222a may form a second internal electrode 122.

Figure 6C:
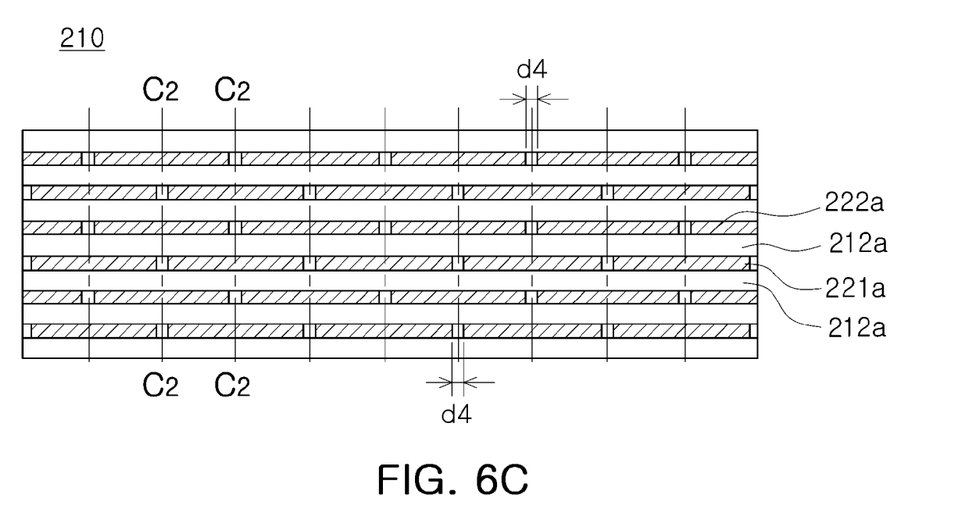
Figure 6D:
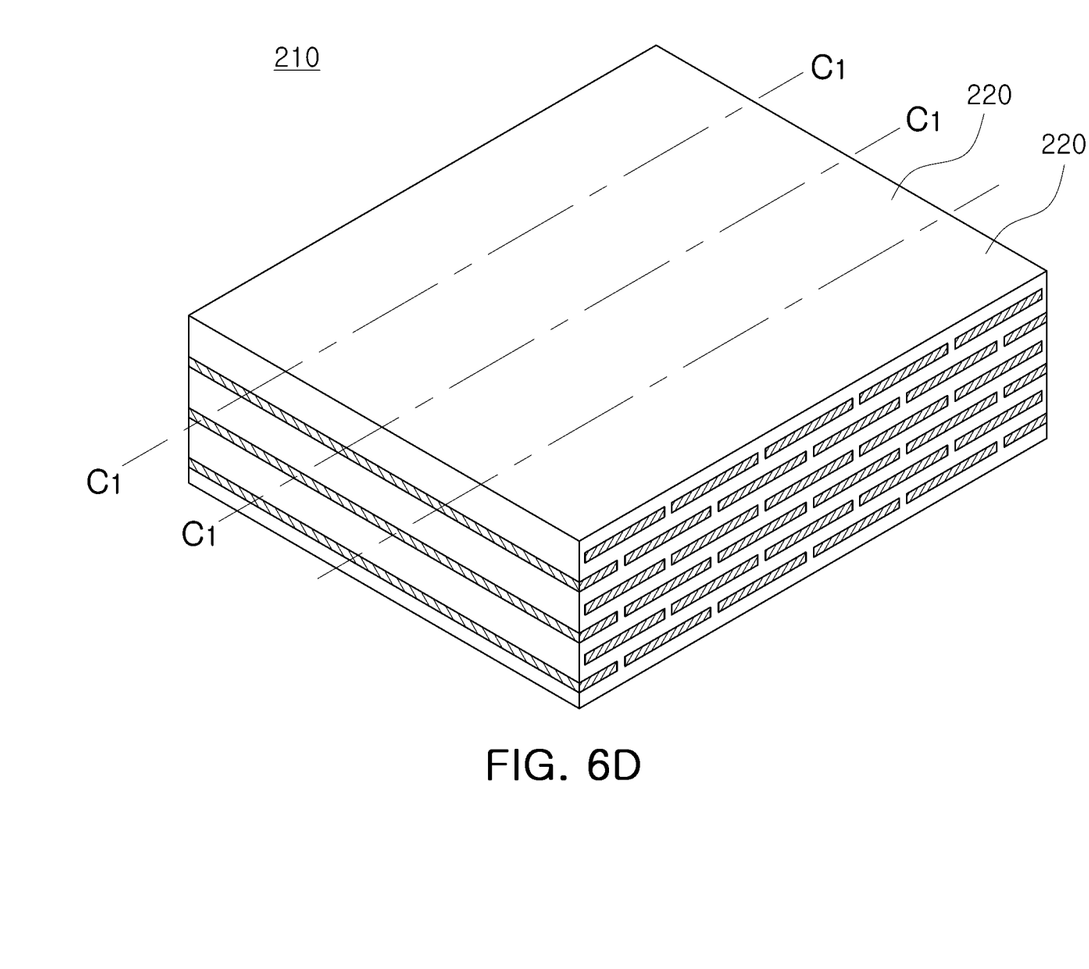

FIG. 6C is a cross-sectional view showing a ceramic green sheet multilayer body 210 in which the first and second ceramic green sheets are stacked according to the embodiment of the present invention, and FIG. 6D is a perspective view showing the ceramic green sheet multilayer body 210 in which the first and second ceramic green sheets are stacked.

Referring to FIGS. 6C and 6D, the first ceramic green sheet on which the plurality of parallel stripe-type first internal electrode patterns 221a are printed and the second ceramic green sheet on which the plurality of parallel stripe-type second internal electrode patterns 222a are printed may be alternately stacked.

In more detail, the first and second ceramic green sheets may be stacked so that a central portion of the stripe-type first internal electrode pattern 221a printed on the first ceramic green sheet and the interval d4 between the stripe-type second internal electrode patterns 222a printed on the second ceramic green sheet are overlapped with each other.

Then, as shown in FIG. 6D, the ceramic green sheet multilayer body 210 may be cut so as to traverse the plurality of stripe-type first and second internal electrode patterns 221a and 222a. That is, the ceramic green sheet multilayer body 210 may be cut into bar-type multilayer bodies 220 along a cutting line C1-C1.

In more detail, the stripe-type first internal electrode pattern 221a and the stripe-type second internal electrode pattern 222a may be cut in a length direction to be divided into a plurality of internal electrodes having a predetermined width. In this case, the stacked ceramic green sheet may also be cut together with the internal electrode pattern. As a result, the dielectric layer may be formed to have the same width as that of the internal electrode.

Edges of the first and second internal electrodes may be exposed to cutting surfaces of the bar-type multilayer body 220. The cutting surfaces of the bar-type multilayer body may be referred to as the first and second side surfaces of the bar-type multilayer body, respectively.

After the ceramic green sheet multilayer body is sintered, the sintered ceramic green sheet multilayer body may be cut into the bar-type multilayer bodies. In addition, after the ceramic green sheet is cut into bar-type multilayer bodies, the sintering may be performed thereon. Although not limited thereto, the sintering may be performed at 1100 to 1300° C. under $N_2$-$H_2$ atmosphere.

Figure 6E:
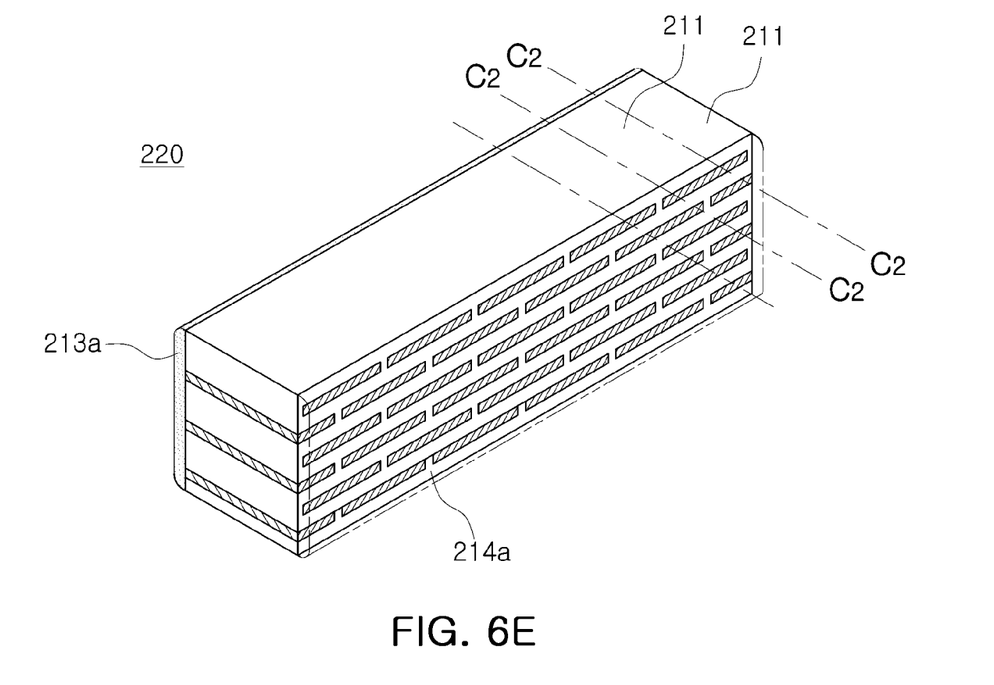

Next, as shown in FIG. 6E, the first and second side surfaces of the bar-type multilayer body 220 may be provided with first and second side margin parts 213a and 214a, respectively. The second side margin part 214a is not clearly shown, but the contour thereof is shown as a dotted line.

The first and second side surfaces of the bar-type multilayer body 220 may be considered as surfaces corresponding to the first and the second side surfaces 1 and 2 of the multi-layer body 111 shown in FIG. 7C.

The first and second side margin parts 213a and 214a may be formed of ceramic slurry containing ceramic powder on the bar-type multilayer body 220.

The ceramic slurry may contain the ceramic powder, an organic binder, and an organic solvent, and an amount of the ceramic slurry may be controlled so that the first and second side margin parts 213a and 214a have desired necessary thickness.

The first and second side margin parts 213a and 214a may be formed by applying the ceramic slurry to the first and second side surfaces of the bar-type multilayer body 220. A method of applying the ceramic slurry is not particularly limited. For example, the ceramic slurry may be sprayed by a spray method or may be applied using a roller.

In addition, the first and second side margin parts 213a and 214a may be formed on the first and second side surfaces of the bar-type multilayer body by dipping the bar-type multilayer body into the ceramic slurry.

As described above, the first and second side margin parts may be formed to have a thickness of 18 μm or less. The thickness of the first and second side margin parts may be defined from the first or second side surface of the bar-type multilayer body to which the edge of the internal electrode is exposed.

Figure 6F:
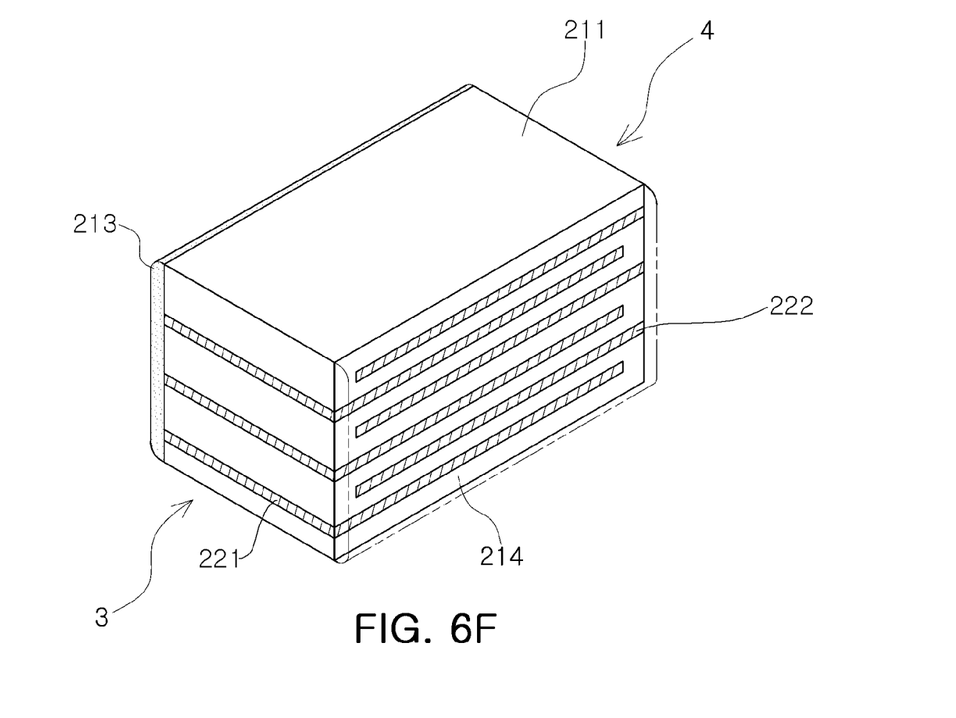

Next, as shown in FIGS. 6E and 6F, the bar-type multilayer body 220 including the first and second side margin parts 213a and 214a formed therein may be cut along a cutting line C2-C2 so as to meet an individual chip size. FIG. 6C may be referenced to determine a position of the cutting line C2-C2.

The ceramic body having the multilayer body 111 and the first and second side margin parts 113 and 114 formed on both side surfaces of the multilayer body may be formed by cutting the bar-type multilayer body 220 to a chip size.

As the bar-type multilayer body 220 is cut along the cutting line C2-C2, the central portion of the first internal electrodes and the predetermined interval d4 formed between the second internal electrodes that are overlapped with each other may be cut on the same cutting line as each other. In other aspect, the central portion of the second internal electrodes and the predetermined interval between the first internal electrodes may be cut along the same cutting line.

Therefore, one ends of the first and second internal electrodes may be alternately exposed to cutting surfaces along the cutting line C2-C2. The surface to which the first internal electrode is exposed may be considered as the third end surface 3 of the multilayer body shown in FIG. 5, and the surface to which the second internal electrode is exposed may be considered as the fourth end surface 4 of the multilayer body shown in FIG. 5.

As the bar-type multilayer body 220 is cut along the cutting line C2-C2, the predetermined interval d4 between the stripe-type first internal electrode patterns 221a may be cut into halves, such that the predetermined interval d2 may be formed between one ends of the first internal electrodes 121 and the fourth end surface. In addition, a predetermined interval may be formed between one ends of the second internal electrodes 122 and the third end surface.

Thereafter, the third and fourth end surfaces may be provided with external electrodes connected to one ends of the first and second internal electrodes, respectively.

According to the embodiment of the present invention, when the first and second side margin parts are formed on the bar-type multilayer body 220 and the multilayer body is cut to have the chip size, the side margin parts may be formed in the plurality of multilayer bodies 111 by one-time process.

In addition, although not shown in the drawing, before forming the first and second side margin parts, the bar-type multilayer body may be cut to have the chip size to form the plurality of multilayer bodies.

That is, the bar-type multilayer body may be cut so that the central portion of the first internal electrode and the predetermined interval between the second internal electrodes that overlap with each other may be cut along the same cutting line. Therefore, one ends of the first and second internal electrodes may be alternately exposed to the cutting surface.

Thereafter, the first and second side surfaces of the multilayer body may be formed with the first and second side margin parts. A method of forming the first and second side margin parts is described above.

Further, the third end surface of the multilayer body to which the first internal electrode is exposed and the fourth end surface of the multilayer body to which the second internal electrode is exposed may be formed with the external electrodes, respectively.

According to another embodiment of the present invention, edges of the first and second internal electrodes may be exposed to the first and second side surfaces of the multilayer body. The plurality of stacked first and second internal electrodes may be simultaneously cut, such that the edges thereof may be disposed on a straight line. Thereafter, the first and second side surfaces of the multilayer body may be simultaneously formed with the first and second side margin parts. The ceramic body is formed by the multilayer body and the first and second side margin parts. That is, the first and second side margin parts may form the first and second side surfaces of the ceramic body.

Therefore, according to the embodiment of the present invention, the distance from the edges of the plurality of internal electrodes to the first and second side surfaces of the ceramic body may be formed constantly. Further, the first and second side margin parts, which are formed of a ceramic paste, may be formed to have a thin thickness.

In addition, the content of glass added to the ceramic paste forming the first and second side margin parts of the ceramic capacitor is controlled, such that the porosity P1 of S1 may be in a range of 1 to 20 ($1 \leq P1 \leq 20$), and the porosity P1 of S1 and the porosity P2 of S2 may satisfy $P1/P2 > 2$.

Therefore, an external impact such as a thermal impact, an electric impact, or the like, may be alleviated, whereby high reliability and high capacitance multilayer ceramic capacitor may be implemented.

The following Table 1 is a table in which reliability of the multilayer ceramic capacitor was compared, depending on the porosity P1 of S1 and the ratio (P1/P2) of the porosity P1 of S1 to the porosity P2 of S2 according to the average thickness of the side margin part of the multilayer ceramic capacitor.

TABLE 1

| Sample No. | Average thickness of side margin part (μm) | Porosity P1 of Region S1 | Ratio of porosity P1 of Region S1 to porosity P2 of Region S2 | Evaluation of reliability (Number of chips in which cracks were generated/entire number of chips) |
|---|---|---|---|---|
| *1 | 16 | 0.5 | 2.0 | 3/200 |
| *2 | 17 | 0.5 | 2.0 | 2/200 |
| *3 | 18 | 0.5 | 2.0 | 2/200 |
| 4 | 19 | 0.5 | 2.0 | 0/200 |
| 5 | 20 | 0.5 | 2.0 | 0/200 |
| 6 | 21 | 0.5 | 2.0 | 0/200 |

Referring to Table 1, it may be appreciated that in samples 1 through 3 in which the average thickness of the side margin part was 18 μm or less, when the porosity P1 of S1 and the ratio (P1/P2) of the porosity P1 of S1 to the porosity P2 of S2 were outside of the numerical range of the embodiment of the present invention, a problem in terms of reliability may be generated.

In samples 4 through 6 in which the average thickness of the side margin part was more than 18 μm, although the porosity P1 of S1 and the ratio (P1/P2) of the porosity P1 of S1 to the porosity P2 of S2 were outside of the numerical range of the embodiment of the present invention, good results were obtained in the evaluation of the reliability.

Therefore, it may be appreciated from a description to be described below that in the multilayer ceramic capacitor according to the embodiment of the present invention, when the average thickness of the side margin part is 18 μm or less, reliability may be improved.

The following Table 2 is a table in which when the average thickness of the side margin part was 18 μm or less, a moisture resistance property and reliability of the multilayer ceramic capacitor were compared depending on the porosity P1 of S1 and the ratio (P1/P2) of the porosity P1 of S1 to the porosity P2 of S2.

($1 \leq P1 \leq 20$), and the ratio (P1/P2) of the porosity P1 of S1 to the porosity P2 of S2 was more than 2 (P1/P2>2), the moisture resistance properties and reliability may be improved.

As set forth above, according to the embodiment of the present invention, the porosity of the first or second side margin part in the multilayer ceramic capacitor is controlled, such that external impact such as thermal impact, electric impact, or the like, may be alleviated, thereby implementing high reliability and high capacitance multilayer ceramic capacitor.

Further, in the multilayer ceramic capacitor, the distance from the edge of the internal electrode to the first or second side surface may be relatively shortened. Therefore, the area of the overlapped portion of the internal electrodes formed in the ceramic body may be relatively increased.

In addition, the distance, from the edge of the internal electrode disposed at the outermost portion, that is, a corner portion at which it may be relatively difficult to remove the residual carbon, to the first or second side surface, may be significantly shortened, thereby easily removing the residual carbon. Therefore, concentration distribution of the residual carbon may be decreased, thereby maintaining the same fine structure and improving connectivity of the internal electrodes.

TABLE 2

| Sample No. | Average thickness of side margin part (μm) | Porosity P1 of Region S1 | Ratio of porosity P1 of Region S1 to porosity P2 of Region S2 | Evaluation of moisture resistance property | Evaluation of reliability (Number of chips in which cracks were generated/entire number of chips) |
|---|---|---|---|---|---|
| 7 | 4.5 | 2 | 2.3 | ○ | 0/200 |
| 8 | 6.2 | 1.3 | 7.8 | ○ | 0/200 |
| 9 | 10.3 | 1.5 | 6.9 | ○ | 0/200 |
| 10 | 7.6 | 10.2 | 2.5 | ○ | 0/200 |
| 11 | 4.5 | 8.4 | 3.4 | ○ | 0/200 |
| 12 | 9.2 | 5.8 | 4.1 | ○ | 0/200 |
| *13 | 7.6 | 0.56 | 3.3 | x | 1/200 |
| *14 | 4.5 | 0.9 | 5.0 | x | 3/200 |
| *15 | 9.2 | 0.82 | 11.2 | x | 3/200 |
| *16 | 8.9 | 6.5 | 1.4 | x | 5/200 |
| *17 | 9.3 | 5.6 | 1.7 | x | 3/200 |
| *18 | 5.6 | 9.2 | 0.6 | x | 3/200 |
| 19 | 13.5 | 4.2 | 2.3 | ○ | 0/200 |
| 20 | 12.9 | 4.5 | 2.5 | ○ | 0/200 |
| 21 | 12.1 | 4.2 | 4.1 | ○ | 0/200 |
| 22 | 8.9 | 6.5 | 3.4 | ○ | 0/200 |
| 23 | 9.3 | 20.0 | 3.3 | ○ | 0/200 |
| 24 | 5.6 | 9.2 | 5.0 | ○ | 0/200 |
| 25 | 7.6 | 18.4 | 5.7 | ○ | 0/200 |
| 26 | 4.5 | 5.8 | 6.7 | ○ | 0/200 |
| 27 | 9.2 | 16.5 | 14.2 | ○ | 0/200 |
| *28 | 13.5 | 0.82 | 1.32 | x | 2/200 |
| *29 | 12.9 | 0.52 | 1.09 | x | 4/200 |
| *30 | 12.1 | 0.38 | 0.97 | x | 4/200 |

*Comparative Example

In Table 2, the evaluation of the moisture resistance property was performed under condition 8585 of a temperature of 85° C. and a humidity of 85% after 200 chips were mounted on a substrate, the evaluation of the reliability was performed by observing whether or not the crack was generated at the time of failure analysis after polishing the chip. More specifically, after the chip was dipped in a lead bath at 320° C. for 2 seconds, whether or not the crack was generated when thermal impact was applied was observed.

In Table 2, the case in which the moisture resistance property was good was represented as "○", and the case in which the moisture resistance property was poor was represented as "x".

As shown in Table 2, it may be appreciated that in the case in which the porosity P1 of S1 was in a range of 1 to 20

Further, the shortest distance from the edge of the internal electrode disposed at the outermost portion to the first or second side surface may be secured at a predetermined thickness, thereby securing the moisture resistance property and decreasing internal defects. In addition, the possibility that radiating cracks will be generated at the time of forming the external electrode may be decreased, and mechanical strength against the external impacts may be secured.

According to the embodiment of the present invention, the plurality of stacked first and second internal electrodes and the ceramic green sheet may be simultaneously cut, such that the edges of the internal electrodes may be disposed on the straight line. Thereafter, the first and second side margin parts may be formed on the surfaces to which the edges of the internal electrodes are exposed. The thickness of the side margin part may be easily controlled according to the amount of ceramic slurry.

The internal electrode may be entirely formed on the dielectric layer in the width direction of the dielectric layer, thereby easily forming the area of the overlapped portion between the internal electrodes and decreasing the generation of the step due to the internal electrodes.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
a ceramic body having first and second side surfaces opposing each other and third and fourth end surfaces connecting the first and second side surfaces to each other;
a plurality of internal electrodes formed in the ceramic body and having one ends thereof exposed to the third or fourth end surface; and
first and second side margin parts formed so that an average thickness from the first and second side surfaces to edges of the internal electrodes is 18 μm or less,
wherein when the first or second side margin part is divided into two regions by a virtual line obtained by connecting mid points of distances between the edges of the internal electrodes and points at which lines extended from the internal electrodes contact the first or second side surface, when a region adjacent to the internal electrodes is defined as S1 and a porosity of S1 is defined as P1, P1 is in a range of 1 to 20 ($1 \leq P1 \leq 20$).

2. The multilayer ceramic capacitor of claim 1, wherein the first and second side margin parts are formed of ceramic slurry.

3. The multilayer ceramic capacitor of claim 1, wherein the internal electrode includes a first internal electrode having one end thereof exposed to the third end surface and the other end formed to have a predetermined interval from the fourth end surface, and a second internal electrode having one end thereof exposed to the fourth end surface and the other end formed to have a predetermined interval from the third end surface.

4. A multilayer ceramic capacitor comprising:
a ceramic body having first and second side surfaces opposing each other and third and fourth end surfaces connecting the first and second side surfaces to each other;
a plurality of internal electrodes formed in the ceramic body and having one ends thereof exposed to the third or fourth end surface; and
first and second side margin parts formed so that an average thickness from the first and second side surfaces to edges of the internal electrodes is 18 μm or less,
wherein when the first or second side margin part is divided into two regions by a virtual line obtained by connecting mid points of distances between the edges of the internal electrodes and points at which lines extended from the internal electrodes contact the first or second side surface, when a region adjacent to the internal electrode is defined as S1, a region adjacent to the first or second side surface is defined as S2, a porosity of S1 is defined as P1, and a porosity of S2 is defined as P2, P1/P2 is larger than 2 ($P1/P2 > 2$).

5. The multilayer ceramic capacitor of claim 4, wherein the first and second side margin parts are formed of ceramic slurry.

6. The multilayer ceramic capacitor of claim 4, wherein the internal electrode includes a first internal electrode having one end thereof exposed to the third end surface and the other end formed to have a predetermined interval from the fourth end surface, and a second internal electrode having one end thereof exposed to the fourth end surface and the other end formed to have a predetermined interval from the third end surface.

7. A method of manufacturing a multilayer ceramic capacitor, the method comprising:
preparing a first ceramic green sheet on which a plurality of stripe-type first internal electrode patterns are formed to have a predetermined interval therebetween and a second ceramic green sheet on which a plurality of stripe-type second internal electrode patterns are formed to have a predetermined interval therebetween;
forming a ceramic green sheet multilayer body by stacking the first and second ceramic green sheets so that the stripe-type first and second internal electrode patterns are alternately stacked;
cutting the ceramic green sheet multilayer body while traversing the stripe-type first and second internal electrode patterns so that first and second internal electrodes have a predetermined width and the ceramic green sheet multilayer body has side surfaces to which edges of the first and second internal electrodes are exposed in a width direction; and
forming first and second side margin parts on the side surfaces to which the edges of the first and second internal electrodes are exposed by using ceramic slurry,
wherein the first and second side margin parts are formed so that an average thickness from the first and second side surfaces to the edges of the internal electrodes is 18 μm or less, and when the first or second side margin part is divided into two regions by a virtual line obtained by connecting mid points of distances between the edges of the internal electrodes and points at which lines extended from the internal electrodes contact the first or second side surface, when a region adjacent to the internal electrodes is defined as S1 and a porosity of S1 is defined as P1, P1 is in a range of 1 to 20 ($1 \leq P1 \leq 20$).

8. The method of claim 7, wherein in the forming of the ceramic green sheet multilayer body, the ceramic green sheets are stacked so that a central portion of the stripe-type first internal electrode pattern and the predetermined interval between the stripe-type second internal electrode patterns are overlapped with each other.

9. The method of claim 7, wherein the cutting of the ceramic green sheet multilayer body includes:
cutting the ceramic green sheet multilayer body into bar-type multilayer bodies having side surfaces to which the edges of the first and second internal electrodes are exposed: and
cutting through a central portion of the first internal electrode and cutting through the predetermined interval between the second internal electrodes, along the same cutting line, to form multilayer bodies having a third or fourth end surface to which one end of the first or second internal electrode is exposed, respectively, after the forming of the first and second side margin parts.

10. The method of claim 7, wherein the cutting of the ceramic green sheet multilayer body includes:

cutting the ceramic green sheet multilayer body into bar-type multilayer bodies having side surfaces to which edges of the first and second internal electrodes are exposed: and cutting a central portion of the first internal electrode and cutting through the predetermine interval between the second internal electrodes along the same cutting line in the bar-type multilayer bodies so as to form multilayer bodies having a third or fourth end surface to which one ends of the first or second internal electrodes are exposed, respectively, and the forming of the first and second side margin parts is performed on the multilayer bodies.

11. The method of claim 7, wherein the forming of the first and second side margin parts is performed by applying the ceramic slurry to the side surfaces to which the edges of the first and second internal electrodes are exposed.

12. The method of claim 7, wherein the forming of the first and second side margin parts is performed by dipping the side surfaces to which the edges of the first and second internal electrodes are exposed in the ceramic slurry.

13. The method of claim 7, wherein when the first or second side margin part is divided into two regions by a virtual line obtained by connecting mid points of distances between the edges of the internal electrodes and points at which lines extended from the internal electrodes contact the first or second side surface, when a region adjacent to the first or second side surface is defined as S2, and a porosity of S2 is defined as P2, P1/P2 is larger than 2 (P1/P2>2).

* * * * *